Jan. 14, 1964 R. F. RENKIN 3,117,895
METHOD OF MAKING HIGH TENSILE STRAPPING
Original Filed Sept. 26, 1957 6 Sheets-Sheet 1

INVENTOR.
Robert F. Renkin
BY Frease & Bishop
ATTORNEYS

Jan. 14, 1964            R. F. RENKIN           3,117,895

METHOD OF MAKING HIGH TENSILE STRAPPING

Original Filed Sept. 26, 1957           6 Sheets-Sheet 2

INVENTOR.
Robert F. Renkin
BY
Frease & Bishop
ATTORNEYS

Jan. 14, 1964 R. F. RENKIN 3,117,895
METHOD OF MAKING HIGH TENSILE STRAPPING
Original Filed Sept. 26, 1957 6 Sheets-Sheet 3

INVENTOR.
Robert F. Renkin
BY
Frease & Bishop
ATTORNEYS

Jan. 14, 1964   R. F. RENKIN   3,117,895
METHOD OF MAKING HIGH TENSILE STRAPPING
Original Filed Sept. 26, 1957   6 Sheets-Sheet 4

INVENTOR.
Robert F. Renkin
BY
Frease & Bishop
ATTORNEYS

INVENTOR.
Robert F. Renkin
BY
Frease & Bishop
ATTORNEYS

United States Patent Office 3,117,895
Patented Jan. 14, 1964

1

3,117,895
METHOD OF MAKING HIGH TENSILE
STRAPPING
Robert F. Renkin, Sharon, Pa., assignor to Sharon
Steel Corporation, Sharon, Pa., a corporation of
Pennsylvania
Original application Sept. 26, 1957, Ser. No. 686,312, now
Patent No. 2,864,607, dated Dec. 16, 1958. Divided
and this application Mar. 28, 1958, Ser. No. 724,737
11 Claims. (Cl. 148—12.4)

The invention relates to the manufacture of steel strapping such as is commonly used for strapping or banding around cartons, bales, boxes, crates and the like, and more particularly to the production of a cold-rolled high tensile strapping, and the present application is a division of my copending application Serial No. 686,312, filed September 26, 1957, now Patent No. 2,864,607, and relates more particularly to the method of producing such high tensile strapping.

Heretofore, steel strapping produced for such purposes has been made from small billets weighing about 35 pounds each, hot rolled to the gauge and width desired for the strapping. There has recently been a demand for such steel strapping of high tensile strength and in 100 pound coils.

Owing to the comparatively short lengths of the strapping heretofore produced, it was necessary to put three such coils together to make a 100 pound coil. This is objectionable because customers now demand a single continuous length of strapping in a 100 pound coil.

The desired physicals in these hot rolled strips were obtained inherently because the strip is heated while rolling and is quenched at the rolls by the usual water sprays directed against the rolls and the strip as it leaves the rolls. However, it has not been possible to maintain the width and gauge tolerances now required by customers, in such hot rolled strips.

Furthermore, the hot rolled strip was painted as a separate operation by passing through a paint tank and then drying in a hot air furnace.

Attempts were made to make high tensile strip on a 14-inch hot strip mill, and slitting the hot rolled strip into a plurality of strips of required width for strapping, but such attempts failed because it was not possible to obtain the gauge required or to obtain the desired physicals in 14-inch hot rolled strip of the required analysis.

Cold rolled strip enables the desired controlled gauge to be obtained, and may be slit into strips of desired width for use as strapping. However, the cold rolled strip is full hard (Rockwell 103B) as produced. It has a high beam load value but low elongation and is not suitable for strapping or bending because it will break if tension is applied.

It is, therefore, an object of the present invention to provide means for producing cold-rolled normalized or tempered steel strapping of desired gauge and width finished in full length 100 pound coils.

Another object of the invention is to provide for the manufacture of such high tensile steel strapping by first forming a cold rolled strip of conventional width and desired gauge, slitting said strip longitudinally to produce a plurality of strips of required width for strapping, and then passing the strips continuously through a burr remover; then through a tempering or normalizing furnace, in which the strips are heated above the critical temperature in a controlled atmosphere; then passing the heated strips through a lead bath where they are quenched at a temperature to secure the desired physical properties; then cooling the strips in a cooling tower, painting, waxing and coiling the finished strips in 100 pound coils.

A further object of the invention is to provide a novel construction of furnace in which the strips are passed through muffle or retort tubes containing controlled atmosphere.

A still further object is the provision of such a furnace having upper and lower series of muffle or retort tubes communicating at one end with a gas-tight return roll housing, whereby the strips pass in a U-shaped path through the furnace and roll housing.

Another object of the invention is to provide apparatus of the character referred to in which a gas-tight lead bath roll housing is interposed between the furnace and the lead bath, with means for maintaining the strips in a controlled atmosphere from the time they enter the furnace until the time they enter the lead bath.

A further object of the invention is to provide such apparatus in which the lead bath is maintained at desired temperature by means of a plurality of alternating U-shaped heating and cooling ducts located in the lead bath and disposed below and on opposite sides of the strips passing therethrough, and means for passing a cooling medium through the cooling ducts and heating medium through the heating ducts, to maintain the lead bath at the desired temperature.

It is also an object of the invention to provide apparatus of the character described including a cooling tower through which the strip is passed in a series of vertical loops after emerging from the lead bath.

Moreover, it is an object of the invention to provide a paint tank in connection with the cooling tower, through which the cooled strip is continuously passed for applying a thin coating of paint to the surfaces of the strip.

Furthermore, it is an object of the invention to provide coil breaker rolls in the exit from the cooling tower to take out any coil set formed in the strips as they pass in a U-shaped path through the furnace.

Another object of the invention is to provide a constant speed control unit for pulling the strips continuously through the various units of the apparatus at the desired speed.

It is also an object of the invention to provide electronic control means in connection with the constant speed control unit for temporarily stopping any strip at the time a weld therein approaches the corresponding re-coiling coiler.

And finally, it is an object of the invention to provide a novel burr removing apparatus for removing burrs or sharp fins from the edges of the slit strips before they are passed through the other units of the apparatus.

The above and other objects, apparent from the drawings and following description, may be attained, the above-described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be briefly described as comprising an apparatus including pay-off reels upon which the comparatively narrow strips are coiled after being slit; burr removers through which the strips are continuously passed to remove burrs or sharp fins formed at the edges thereof by slitting; a normalizing or tempering furnace having two series of muffle tubes located entirely therethrough and communicating at the rear of the furnace with a gas-tight return roll chamber; a second gas-tight roll chamber communicating with the discharge ends of one series of muffle tubes; a lead bath located adjacent the last-named roll housing and connected thereto by a spout extending below the lead level; means for maintaining a controlled atmosphere within the roll housings and muffle tubes; spaced rolls in the lead bath; transversely disposed U-shaped coolant tubes and heating tubes located alternately throughout the length of the lead bath; a coke breeze box at the exit side of the lead bath; a cooling tower above and beyond the lead bath with roll means therein for passing the strips in vertical loops therethrough; a paint tank through which the cooled strip is passed; coil breaker rolls at the exit of the cooling tower for removing coil set in the strips; constant speed control means for continuously moving the strips through all of said apparatus; coilers upon which the finished strips are coiled; electronic means associated with the constant speed control unit for stopping each strip as a weld therein approaches the corresponding coiler, and a waxing machine between the constant speed control unit and the coilers for waxing the painted finished strips.

The burr remover comprises a spaced pair of frame members having carborundum blocks in engagement with the opposite surfaces of the strip as it is passed continuously therethrough for removing burrs formed at the edges of the strips by slitting the same.

The strips are heated above the critical temperature in the tempering or normalizing furnace and are then quenched at desired temperature in the lead bath for obtaining desired grain structure and required physical properties.

It is known that coils of steel strips have been slit into required width to form tube, then passed through forming rolls where they are formed into tubes and welded. It is also known that steel wire has been tempered by heating above the upper transformation point and then quenching in molten lead.

However, it is not known to applicant that high tensile steel strapping has ever been produced before his invention, by cold rolling steel strip to desired controlled gauge, slitting into strips of desired width for use as strapping, coiling the slit strips, and then in a continuous process, uncoiling the strips and passing them continuously through burr removers; through a normalizing or tempering furnace; through a molten lead bath for quenching; through a paint tank and dryer, and then coiling in coils of steel strapping.

Having thus briefly described the nature of the invention, reference is now made to the accompanying drawings forming part hereof, in which.

Reference is now made more particularly to the construction illustrated in the drawings, in which similar numerals refer to similar parts throughout.

In the manufacture of high tensile steel strapping in accordance with the invention, steel having substantially the following analysis is used:

| | |
|---|---|
| Carbon | 45/55 |
| Manganese | 60/90 |
| Phosphorus | .025 |
| Sulphur | .04 |

By conventional strip-rolling apparatus, this steel is hot rolled and then cold rolled to desired gauge which may be .031", .035" or other desired gauge, and of conventional cold rolled strip width. The cold rolled strip of desired gauge is then slit longitudinally into strips of the width desired for the steel strapping, which may be ¾", 1¼" or 2" wide as desired.

Figure 15:
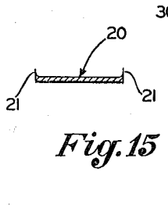
FIG. 15 is an enlarged, transverse sectional view through one of the slit strips, showing the burrs or fins at the edges thereof.

In the process of slitting the cold rolled strip into narrow strips for use as strapping, each of the slit strips, as indicated generally at 20 in FIG. 15, has burrs or sharp fins formed at its longitudinal edges, as indicated at 21.

Figures 1, 16, 17, 18:
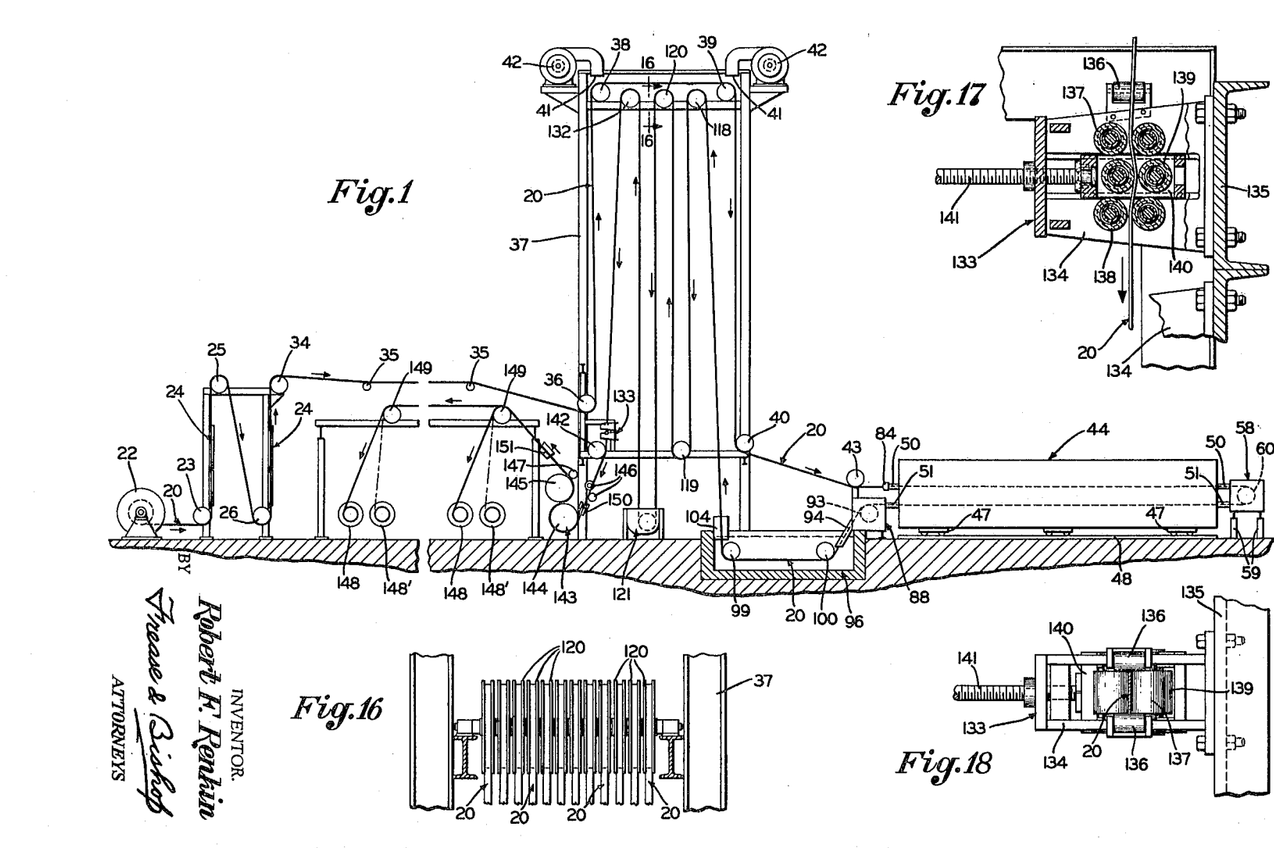
FIG. 1 is a diagrammatic side elevation, partly in section, showing the complete apparatus for manufacture of high tensile strapping.
FIG. 16 is an enlarged, transverse sectional view through the upper portion of the cooling tower, showing one of the series of rollers over which the strips are looped, taken as on the line 16—16, FIG. 1.
FIG. 17 is a vertical sectional view through the coil breaker rollers at the exit of the cooling tower.
FIG. 18 is a top plan view of the coil breaker shown in FIG. 17.

In order to pass these strips through the apparatus to which the invention pertains, the strips are wound upon pay-off reels as indicated at 22 in FIG. 1, the strip being oscillated in winding upon the reels so as to provide a compact amount of strip on each reel.

The apparatus is designed to simultaneously pass twelve strips through the various units at one time. For this purpose, twelve pay-off reels, as indicated at 22, would be provided, although only one such reel is shown in the drawings.

About 3,000 pounds of the strips, which have been slit to the required width, are coiled upon each of the twelve pay-off reels, from which the several strips are then unreeled and passed through the apparatus in the manner hereinafter described in detail.

As the strips 20 are uncoiled from the pay-off reels 22 in horizontal direction, they pass around rollers 23 and upward through a stand of burr-remover devices, indicated generally at 24, and then looped around the upper and lower rollers 25 and 26 and pass upward through a second stand of burr-remover devices 24.

Figure 2:
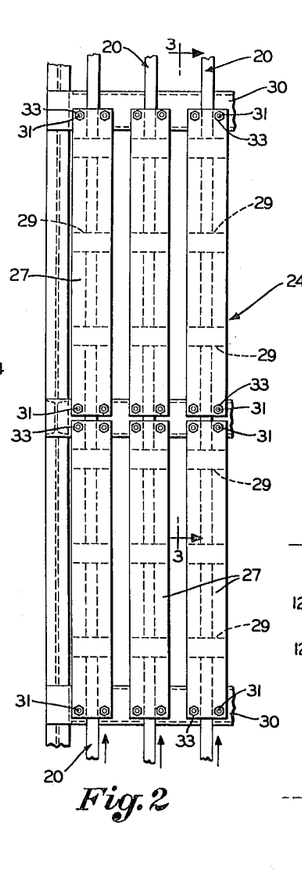
FIG. 2 is a side elevation of one of the burr removing devices.
Figure 3:
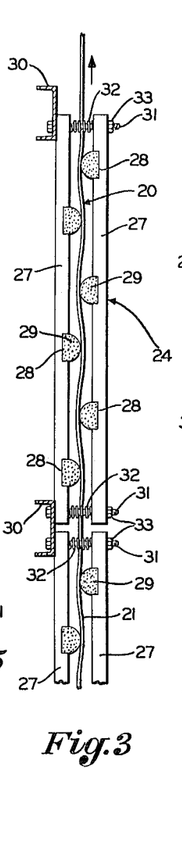
FIG. 3 is a fragmentary, vertical sectional view of the burr removing device shown in FIG. 2, taken as on the line 3—3, FIG. 2.

As shown in FIGS. 2 and 3, each of the burr-remover devices 24 comprises vertically arranged spaced pairs of mounting plates 27, having transverse grooves 28 in their opposed surfaces, which are located in staggered relation, as best shown in FIG. 3, and in which are mounted the carborundum stones 29 alternately directed toward each other at spaced intervals.

The mounting plates 27 are pulled together and attached to the supporting frame 30, at the upper and lower ends of each pair of mounting plates, as by the bolts 31, coil spring 32 maintaining separation of the stone-mounting plates 27.

There are six sets of stones on each side of each strip 20 passing therethrough, and the surfaces of the strips rub alternately against the rounded noses of each of the stones 29 in passing through the burr-remover units, thus grinding away or removing any sharp fins or burrs as indicated at 21, which may project at the edges of the strip as a result of the slitting operation.

As the stones 29 wear, the bolts may be pulled up by the nuts 33 against the tension of the springs 32. These springs cushion the mounting so that there is some yield thereto when an end weld goes past the stones, so as to accommodate end welds in the strips as well as different thicknesses of strip material.

The stone mounting plates 27 are preferably formed of wood, and thus have some bending flexibility to permit the stones to maintain contact with the strip as it passes thereover.

After passing upward through the second stand of burr removers 24, the strips pass over rolls 34 and then forwardly over smaller rolls 35 to the rolls 36 in the lower portion of the cooling tower 37.

From the rolls 36, the strips pass upward in the cooling tower and over the rolls 38 in the upper end thereof, then forwardly through the top of the cooling tower and over the rolls 39, and then downwardly and over the rolls 40 in the lower end of the cooling tower. In thus passing through the cooling tower 37, the strips may be slightly preheated by passing adjacent to the hot strips coming from the lead bath as will be later described.

Discharge outlets 41 are provided in the top of the cooling tower 37 and communicate with exhaust fans 42 by means of which the cooling tower may be maintained at proper temperature and vapors and fumes from the paint tank may be exhausted.

From the rolls 40 in the lower end of the cooling tower, the strips then pass over the rolls 43 to the tempering or normalizing furnace, indicated generally at 44. This furnace is shown in detail in FIGS. 4 to 7 and includes the shell 45 having refractory insulation lining 46 therein.

Figures 4, 5, 6:
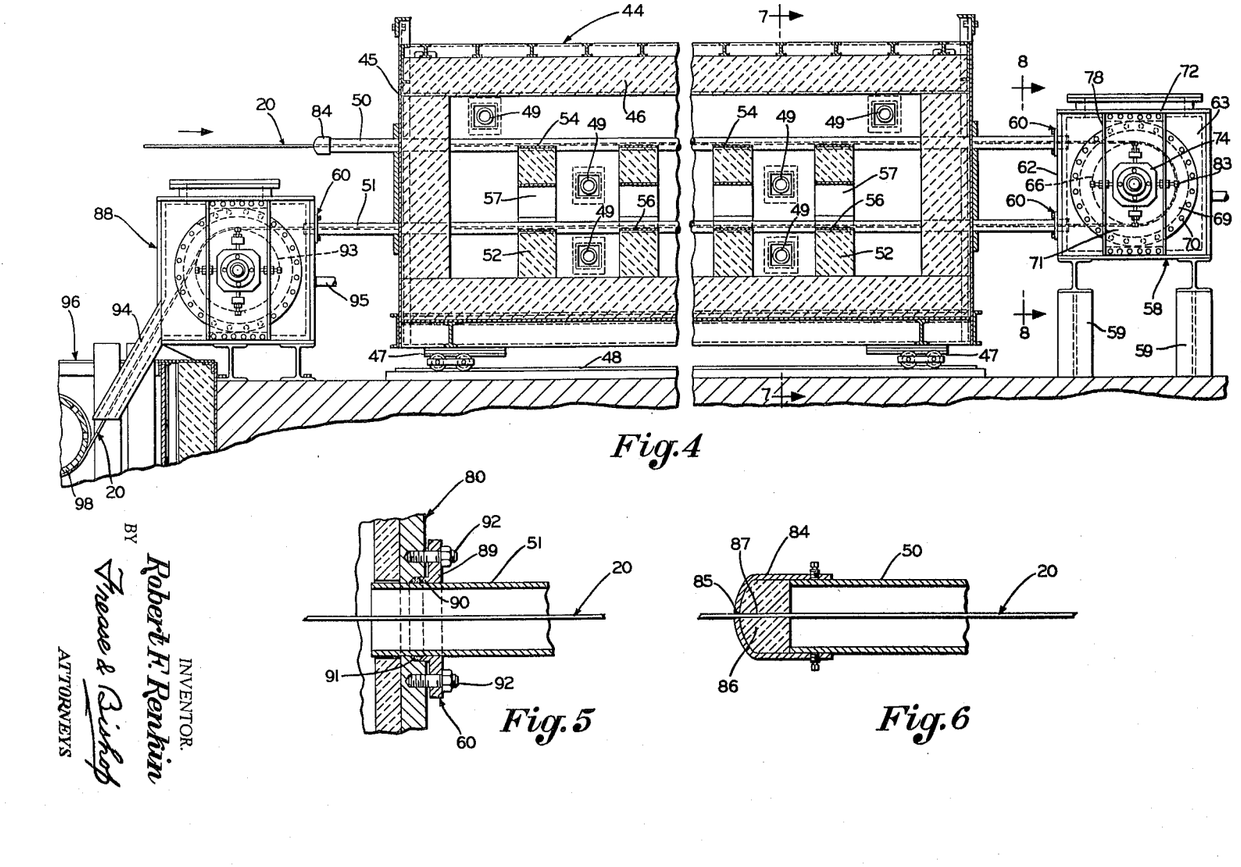
FIG. 4 is a longitudinal sectional view through the tempering or normalizing furnace, showing the muffle tubes therein and the roll housings connected thereto.
FIG. 5 is an enlarged, fragmentary sectional view showing the connection of one of the muffle tubes of the furnace to one of the roll housings.
FIG. 6 is an enlarged, fragmentary sectional view of the entrance end of one of the muffle tubes.

The furnace is mounted upon trucks 47, located upon track rails 48, to permit longitudinal movement of the furnace and muffle tubes therein, as the same may be elongated or contracted due to temperature changes therein.

Figures 7, 8:
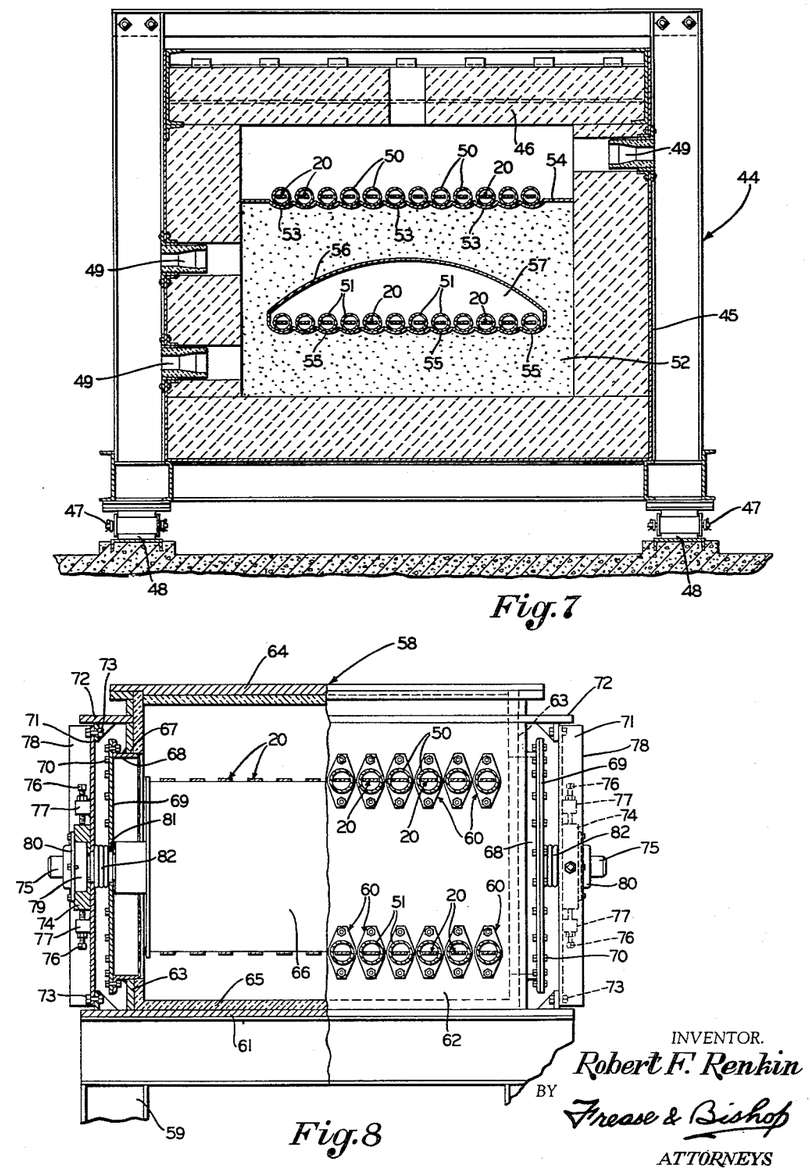
FIG. 7 is an enlarged, transverse sectional view through the furnace, taken as on the line 7—7, FIG. 4.
FIG. 8 is an enlarged, transverse sectional elevation of the return roll housing, taken as on the line 8—8, FIG. 4.

Suitable heating means may be provided in the side walls of the furnace, such as the fuel burners 49 shown in FIGS. 4 and 7. The furnace is a muffle-type furnace and is provided with the upper and lower series of muffle tubes 50 and 51 respectively, conforming to the number of strips 20 being passed through the apparatus.

The muffle tubes 50 and 51 extend longitudinally entirely through the furnace and protrude from both ends thereof, as best shown in FIG. 4. These muffle tubes are supported within the furnace upon the refractory support members 52, the upper series of muffle tubes 50 being supported in spaced relation in the corrugations 53 in the metal plate 54 on the top of each refractory support member 52. The lower series of muffle tubes are supported in similar corrugations 55 in a metal plate 56 located in the opening 57 in each refractory support member 52.

A return roll housing, indicated generally at 58, is located beyond the furnace 44, and stationarily mounted relative to the furnace, as upon the piers 59. The adjacent ends of the muffle tubes 50 and 51 are slidably located through stuffing boxes, indicated generally at 60, in the adjacent side wall of the roll housing 58.

The roll housing 58 is of gas-tight construction and as best shown in FIG. 8, comprises the metal bottom wall 61, side walls 62, end walls 63 and top wall 64, with refractory lining 65 therein. A return roll 66 is journalled in the return roll housing 58 so that the several strips 20 passing out of the upper muffle tubes 50 pass around the roll 66 and return through the furnace through the lower muffle tubes 51.

A circular opening 67 is provided in each end plate 63 of the roll housing 58, and a flanged ring 68 is welded therein, a disc 69 being attached to the flanged ring 68 as by bolts 70. A channel member 71 is connected to an extension of the bottom wall 61 and to a flange 72 on the upper portion of the end wall 63, as by bolts 73, and carries a bearing block 74 for the adjacent end portion of the roll shaft 75.

The bearing block 74 is adapted to be adjusted vertically and horizontally as by the adjusting bolts 76, located through lugs 77 on the channel member 71 and through the vertical flanges 78 of the channel member respectively.

A roller or ball bearing, indicated generally at 79, is carried in the bearing block 74, with a seal 80 over the outer side of the block 74 surrounding the bearing. The shaft 75 of the roll extends through a suitable aperture 81 in the disc 69, and a seal 82 surrounds the shaft between the disc 69 and the channel member 71.

Any conventional means, as indicated at 83, is provided for charging special controlled atmosphere to the interior of the return roll housing 58. For the purpose of sealing the special atmosphere within the tubes 50 of the furnace, the charging ends of these tubes may be provided with caps 84 having narrow slots 85 therein to receive the strips 20, a block of asbestos or the like, as indicated at 86, being located within eahc cap 84 and having a slot 87 therein through which the strip 20 has a sliding fit. The special atmosphere which escapes at this point may be lighted and burned with a flame.

A lead bath roll housing, indicated generally at 88, is located at the exit end of the lower muffle tubes 51 and is of substantially the same construction as the return roll housing 58.

The discharge ends of the lower muffle tubes 51 are slidably located through stuffing boxes 60 in the adjacent side wall of the lead bath roll housing 88. These stuffing boxes 60 are of the same construction as the stuffing boxes 60 through which the ends of the muffle tubes 50 and 51 are slidably located in the return roll housing 58.

One of these stuffing boxes is shown in detail in FIG. 5 and comprises the flanged plate 89 surrounding each muffle tube with inturned annular flange 90 thereon compressing the stuffing material 91 around the muffle tube so as to provide a gas-tight seal. Conventional bolts 92 are provided for adjusting the stuffing boxes 60 in usual and well known manner.

As the strips 20 pass out of the muffle tubes 51 into the lead bath roll housing 88, they pass over the roll 93 therein and down through the spout 94, which extends below the level of the lead bath in the lead tank, as will be later described.

Means, such as indicated at 95, may be provided for charging controlled atmosphere to the lead bath roll housing 88, whereby both of the roll housings 58 and 88, all of the muffle tubes 50 and 51, and the spout 94 are continuously filled with controlled atmosphere.

Thus the strips 20 are protected by the controlled atmosphere from the time they enter the upper series of muffle tubes 50 until they enter the lead bath, so as to prevent excessive scaling and lead pick-up in the bath.

The chamber of the furnace 44 is maintained at a temperature between 1600° F. and 1800° F. so as to provide a strip temperature above the critical point, at approximately 1550° F., as the strips leave the furnace.

The lead bath pot is indicated generally at 96, and is shown in detail in FIGS. 9 to 12. A bath of molten lead is maintained in the lead pot 96 to a level as indicated at 97. Spaced rollers 98 and 99 are mounted within the lead pot, beneath the lead level, near the entrance and exit ends of the lead pot, respectively.

Figure 9:
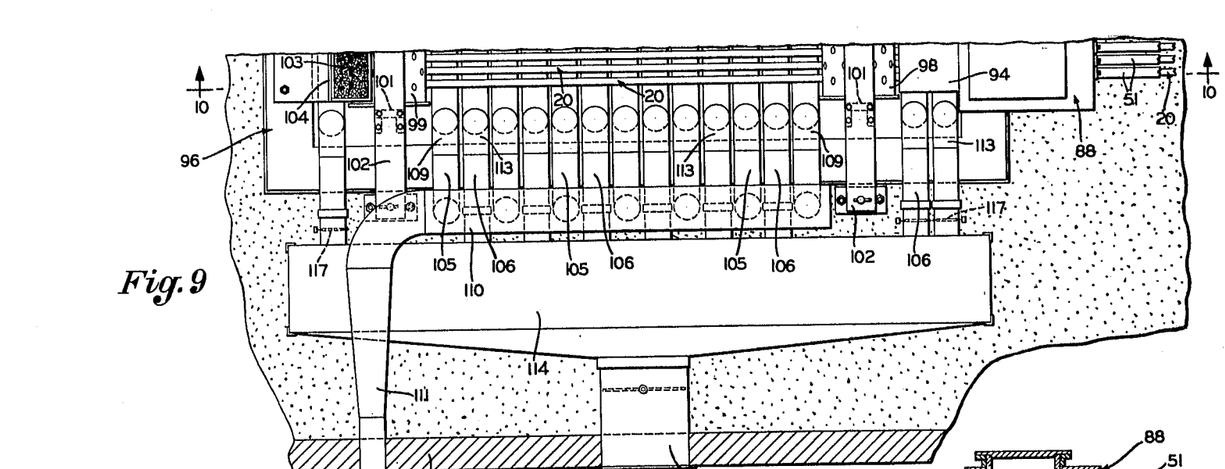
FIG. 9 is a fragmentary top plan view of the lead bath.
Figure 10:
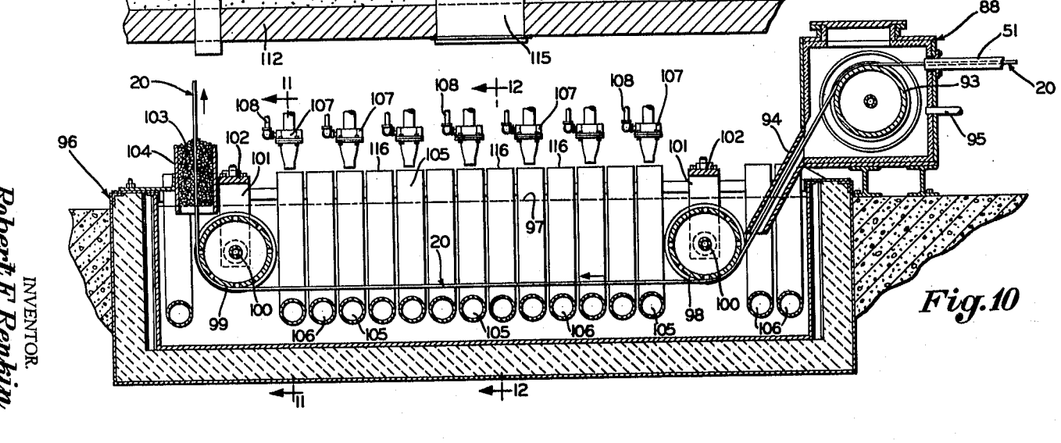
FIG. 10 is a longitudinal sectional view through the lead bath, taken as on the line 10—10, FIG. 9.

The shafts 100 of these rollers are journalled in depending arms 101 of hold-down devices 102 mounted transversely across the top of the lead pot 96 near opposite ends thereof, the arms 101 extending down into the lead bath near opposite sides of the lead pot.

The strips 20 pass out of the lower end of the spout 94, below the lead level and under the roller 98, then horizontally through the lead bath to the exit end of the lead pot and then around the roller 99 and upward through coke breeze, as indicated at 103, located within a coke box 104 surrounding the strips 20 as they emerge from the lead bath.

The bath of molten lead in the lead pot is maintained at a temperature between 900° F. and 1100° F. to quench the hot strips for obtaining the desired grain structure and required physical properties therein.

For the purpose of maintaining the molten lead bath at the desired temperature, alternate U-shaped heating tubes 105 and U-shaped cooling tubes 106 are located transversely within the lead pot extending down along each side thereof and below the path of strips 20 through the lead bath.

Figure 11:
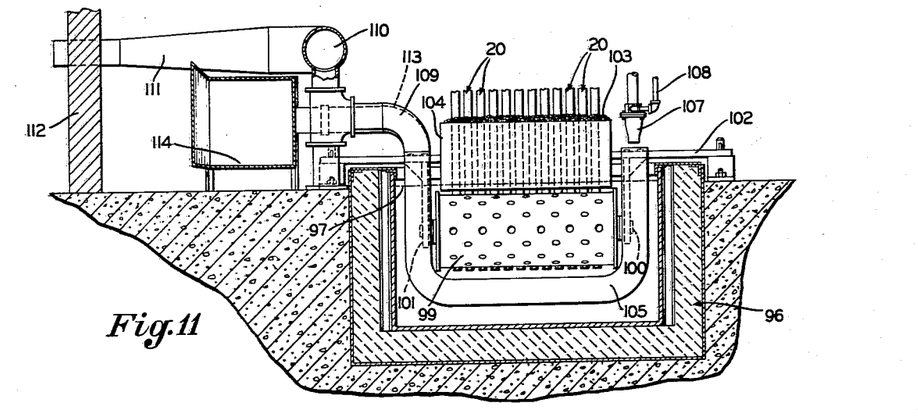
FIG. 11 is a transverse sectional view through the lead bath at one of the heating tubes, taken as on the line 11—11, FIG. 10.

Fuel burners 107, connected by pipes 108 to a suitable source of fuel such as gas or oil, are located at the open upper ends of the heating tubes 105 along the right side of the lead pot, as viewed in FIG. 11, so as to direct the flame downward into the heating tubes 105.

The opposite end of each heating tube 105 is connected, as by the elbows 109, with a heat exhaust manifold 110 connected to the heat exhaust pipe 111 which may be located through a wall 112 of the building in which the apparatus is located, so as to exhaust outside.

Figure 12:
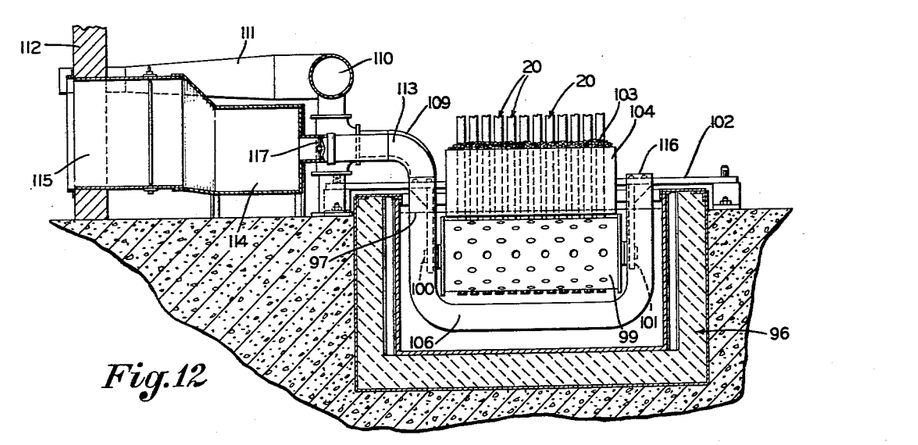
FIG. 12 is a transverse section through the lead bath at one of the coolant tubes, taken as on the line 12—12, FIG. 10.

Cooling air is circulated in the opposite direction through the U-shaped cooling tubes 106. For this purpose the left side end of each cooling tube 106, as viewed in FIG. 12, is connected by elbow 113 with a cooling air duct or manifold 114 which communicates with a cooling air inlet 115, which may extend through the wall 112 of the building and connects to a suitable source of cooling air supply, such as a blower fan or the like.

With this construction cooling air is blown through the U-shaped cooling tubes 106 and exhausted through the open ends 116 thereof. Valves or dampers 117, as shown in FIG. 12, may be provided in the elbows 113 leading to the entrance ends of the cooling tubes 106, to be operated to control the passage of cooling air through the cooling tubes.

If desired, any conventional thermostatic device may be provided for controlling the burners 107 and the admission of cooling air to the cooling tubes 106, in order to maintain the desired temperature in the lead bath.

As the quenched strips 20 emerge from the lead pot and pass upward through the coke breeze 103, they enter the cooling tower 37, passing up to the top of the cooling tower and over the rolls 118, then loop down to the lower end of the tower, under the rolls 119 and again up to the top of the tower and over the rolls 120 from which they pass down through the cooling tower to the paint tank, indicated generally at 121, located below the cooling tower.

By this time the strip has been cooled in the cooling tower to such extent that it approaches the paint tank at a temperature only slightly above 180° F. The paint tank, as shown in detail in FIGS. 13 and 14, has a roll 122 journalled therein below the paint level 123. The shaft 124 of this roll is journalled in the depending arms 125 of a hold-down device, indicated generally at 126, and located across the top of the paint tank.

Figure 13:
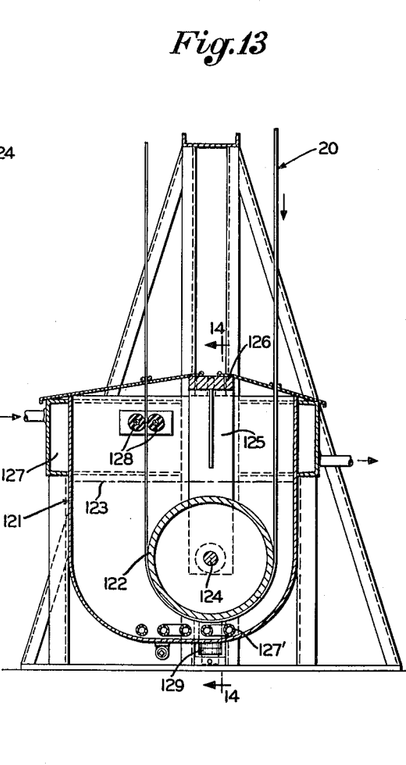
FIG. 13 is an enlarged transverse sectional view through the paint tank.
Figure 14:
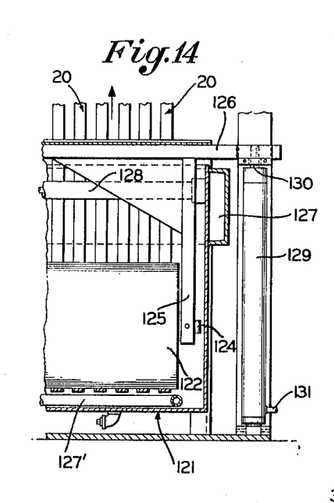
FIG. 14 is a fragmentary longitudinal sectional view through the paint tank, taken as on the line 14—14, FIG. 13.

The heat of the strips entering the paint tank maintains the paint heated, and cooling means such as the water jacket 127 above the paint level, and the submerged cooling coil 127', maintain the paint temperature at about 180° F. which is the strip temperature as painted.

As the strips leave the paint bath, in which they are coated with paint while submerged therein, they pass between a pair of rubber-coated rollers 128 moving in the direction of strip travel. The pressure between the rollers 128 controls the thickness of paint coating upon the strips.

For the purpose of removing the roll 122 from the paint tank when necessary for cleaning or repairs, a pair of vertically disposed fluid cylinders 129 may be mounted at opposite sides of the paint tank, the piston rods 130 thereof being connected to the hold-down device 126.

By admitting fluid to the lower end of each cylinder as through the inlet 131, the pistons may be extended vertically, raising the hold-down device 126 and with it the roll 122 out of the paint tank.

After leaving the paint tank, the strips again pass upwardly into the cooling tower 37 and are further cooled so that as they reach the rolls 132 in the top of the cooling tower, the paint is sufficiently dry so that it will not stick to these rolls.

The heat of the steel remaining in the strip, and the hot air in the cooling tower, radiated from the hot portions of the strips as they emerge from the lead bath, quickly dries the paint between the point of exit from the paint tank and the upper cooling tower conveyor rolls 132.

If the strip were cool when painted, it would not be dry enough on leaving the rolls 132 to prevent sticking to the rolls. With this construction a separate oven for drying the paint at this point is not required. The water cooling jacket 127 above the paint level condenses volatiles above the paint, thus preventing a paint solvent loss or drag-out.

After passing down through the cooling tower, from the upper conveyor rolls 132, the strips 20 pass through a series of coil breaker rolls, indicated generally at 133, and shown in detail in FIGS. 17 and 18. These breaker rolls are provided for the purpose of taking out any coil set produced by the passing of the hot strips from the furnace around the return roll 78 and back through the furnace, so that the strips will lay flat.

Each of the breaker roll devices comprises a box 134, open at its upper and lower ends and mounted upon a suitable support 135 in the lower end of the cooling tower. A spaced pair of guide rolls 136 is located at the top of the box 134 for engaging opposite edges of the strip 20 and guiding it to the breaker rolls.

The breaker rolls comprise upper and lower spaced pairs of rolls 137 and 138 respectively, located in vertical alignment and journalled in opposite side walls of the box 134, and a pair of rolls 139 journalled upon a block 140, movable laterally relative to the rolls 137 and 138 by means of an adjusting screw 141. With this construction the block 140 carrying the rolls 139 may be adjusted relative to the rolls 137 and 138 to desired position to take out coil set in the strips.

After passing through the breaker rolls, the strips pass downward around rolls 142 to the bridle stand or speed control device, indicated generally at 143. This speed control device comprises a pair of cooperating rubber-covered rolls 144 and 145, around which the strips are reversely wrapped, the lowermost roll 144 being driven, and the strips driving the upper roll 145.

Just ahead of the driven bridle stand roll 144, edge guide rolls 146 are provided to properly space the several strip strands. A small steel pressure roll 147 engages the upper roll 145 of the bridle stand, the strip passing between the upper roll 145 and the steel pressure roll 147.

It should be understood that this bridle stand provides the means for conveying the strips through all of the apparatus above described. Between the bridle stand and each pair of coilers 148 is an idler roll 149 over which each strip strand is conveyed to the corresponding pair of coilers 148 and 148'.

An electronic device 150 is located just ahead of the bridle stand and includes means such as an electric eye for each strand of strip. The purpose of these devices is to detect welds in the strips and to operate a suitable electrically controlled device associated with each of the coilers 148 and 148' so as to stop the corresponding strip when a weld therein approaches the corresponding coiler 148 or 148'.

Both visual and audible signals may be given at this time so that an operator may cut out the weld, and, assuming that the strip is being coiled upon a coiler 148, the leading end of the strip, after the weld has been cut out, is then started on the corresponding coiler 148' and the coiler 148, with the strip coiled thereon, is removed and replaced by an empty coiler so that the operation may be repeated.

Between the bridle stand and the coilers, each strip may pass through a waxer, indicated generally at 151. The coilers 148 and 148' are synchronized with the bridle stand 143 so as to convey the strips and take up slack therein but not to pull the strips under tension from the bridle stand to the coilers.

Steel strapping produced in the manner above described, by cold rolling strip from steel of the analysis above given, to the desired gauge, then slitting into strips of required width and normalizing in the manner above described in detail, meets all of the requirements of high tensile steel strapping. The required width and gauge tolerances may be maintained in the finished strapping, and the desired chemical and physical properties obtained therein.

Such strapping may be produced in full 100 pound coils, and it has the required beam load, tensile strength and elongation. For instance, a strip produced in this manner, of 1¼ inch width and .035 inch gauge has a 5,000 pound minimum beam load, 125,000 to 135,000 pounds tensile strength, and 12% to 18% elongation in 4 inches.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, continuously moving the strips longitudinally and removing burrs and fins from the edges of the moving strips, heating said strips in a controlled atmosphere to above the critical temperature, quenching the heated strips in a molten lead bath at a temperature of 900° F. to 1100° F. to obtain the desired grain structure and required physical properties therein necessary for steel strapping, air cooling the strips, and coiling the cooled strips.

2. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, continuously moving the strips longitudinally and removing burrs and fins from the edges of the moving strips, heating said strips in a controlled atmosphere to above the critical temperature, quenching the heated strips in a molten lead bath at a temperature of 900° F. to 1100° F. to obtain the desired grain structure and required physical properties therein necessary for steel strapping, air cooling the strips to a temperature slightly above 180° F., painting the strips at approximately 180° F., further cooling the painted strips to dry the paint thereon, and coiling the painted strips.

3. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, continuously moving the strips longitudinally, removing burrs and fins from the edges of the moving strips, heating the moving strips in a controlled atmosphere to above the critical temperature, quenching the heated moving strips in molten lead at a temperature of 900° F. to 1100° F. to obtain the desired grain structure and required physical properties therein necessary for steel strapping, air cooling the moving strips, and coiling the cooled strips.

4. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, continuously moving the strips longitudinally, removing burrs and fins from the edges of the moving strips, heating the moving strips in a controlled atmosphere to above the critical temperature, quenching the heated moving strips in molten lead at a temperature of 900° F. to 1100° F. to obtain the desired grain structure and required physical properties therein, necessary for steel strapping, air cooling the moving strips to a temperature slightly above 180° F., painting the moving strips at approximately 180° F., further cooling the painted strips to dry the paint thereon, and coiling the painted strips.

5. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, coiling each of said strips, then uncoiling said strips and continuously moving them longitudinally, removing burrs and fins from the edges of the moving strips, preheating the moving strips, heating the preheated moving strips in a controlled atmosphere to about 1550° F., quenching the heated moving strips in molten lead at a temperature of 900° F. to 1100° F. to obtain the desired grain structure and required physical properties therein necessary for steel strapping, air cooling the moving strips to a temperature slightly above 180° F., passing the moving strips at about 180° F. through a paint bath, further cooling the painted strips to dry the paint thereon, and coiling the painted strips.

6. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, coiling each of said strips, then uncoiling said strips and continuously moving them longitudinally, removing burrs and fins from the edges of the moving strips, preheating the moving strips, heating the preheated moving strips in a controlled atmosphere to about 1550° F., quenching the heated moving strips in molten lead at a temperature of 900° F. to 1100° F. to obtain the desired grain structure and required physical properties therein necessary for steel strapping, air cooling the moving strips to a temperature slightly above 180° F., passing the moving strips at about 180° F. through a paint bath, further cooling the painted strips to dry the paint thereon, removing coil set from the moving painted strips, and coiling the painted strips.

7. The method of producing high tensile steel strapping of desired gauge and width which consists in cold rolling a relatively wide medium high carbon steel strip to required gauge for steel strapping, longitudinally slitting said steel strip into a plurality of strips of desired width and gauge for steel strapping, coiling each of said strips, then uncoiling said strips and continuously moving them longitudinally, preheating the moving strips, heating the preheated moving strips in a controlled atmosphere to about 1550° F., quenching the heating moving strips in molten lead at a temperature of 900° F. to 1100° F. to obtain the desired grain structure and required physical properties therein necessary for steel strapping, air cooling the moving strips to a temperature slightly above 180° F., passing the moving strips at about 180° F. through a paint bath, further cooling the painted strips to dry the paint thereon, waxing the moving painted strips, and coiling the painted strips.

8. The method of producing high tensile steel strapping of desired gauge and width which consists in cold rolling a relatively wide medium high carbon steel strip to required gauge for steel strapping, longitudinally slitting said cold-rolled steel strip into a plurality of strips of desired width and gauge for steel strapping, coiling each of said strips, then uncoiling said strips and continuously moving them longitudinally, removing burrs and fins from the edges of the moving strips, preheating the moving strips, heating the preheated moving strips in a controlled atmosphere to about 1550° F., quenching the heated moving strips in molten lead at a temperature of 900° F. to 1100° F. to obtain the desired grain structure and required physical properties therein necessary for steel strapping, air cooling the moving strips to a temperature slightly above 180° F., passing the moving strips at about 180° F. through a paint bath, further cooling the moving painted strips to dry the paint thereon, removing coil set from the moving painted strips, waxing the moving painted strips, and coiling the painted strips.

9. The method of producing high tensile steel strapping of desired gauge and width which consists in cold rolling a relatively wide strip of steel containing about 0.45/.55 carbon, .60/.40 manganese, .025 phosphorus and .04 sulphur, to required controlled gauge for steel strapping, longitudinally slitting said cold rolled steel strip into a plurality of strips of desired width and gauge for steel strapping, coiling each of said strips in a coil of up to 3000 pounds, then uncoiling said strips and continuously moving them longitudinally, removing burrs and fins from the edges of the moving strips, heating the moving strips in a controlled atmosphere to about 1550° F., quenching the heated moving strips in molten lead at a temperature of 900° to 1100° F. to obtain the desired grain structure and required physical properties therein necessary for steel strapping, air cooling the moving strips to a temperature slightly above 180° F., passing the moving strips through a paint bath, further cooling the moving painted strips to dry the paint thereon, waxing the moving painted strips, and coiling the painted, waxed strips in coils of about 100 pounds.

10. The method of producing high tensile steel strapping of desired gauge and width which consists in cold rolling a relatively wide medium high carbon strip to desired gauge for steel strapping, longitudinally slitting said steel strip into a plurality of strips of desired width and gauge for steel strapping, coiling each of said strips in a coil up to 3000 pounds, then uncoiling said strips and continuously moving them longitudinally, removing burrs and fins from the edges of the moving strips, heating the moving strips in a controlled atmosphere to above the critical temperature, quenching the heated moving strips in molten lead to obtain the desired grain structure and required physical properties therein necessary for steel strapping, air cooling the moving strips, and coiling the strips in coils of about 100 pounds.

11. The method of producing high tensile steel strapping of desired gauge and width in coils of about 100 pounds weight, which consists in cold rolling a relatively wide medium high carbon strip to desired gauge for steel strapping, longitudinally slitting said steel strip into a plurality of strips of desired width and gauge for steel strapping, coiling each of said strips in a coil up to 3000 pounds, then uncoiling said strips and continuously moving them longitudinally, removing burrs and fins from the edges of the moving strips, preheating the moving strips by passing them through a coiling tower in proximity to previously heated portions of the strips, heating the preheated moving strips in a controlled atmosphere to about 1550° F., maintaining the heated moving strips in the controlled atmosphere while quenching them in molten lead at a temperature of 900° F. to 1100° F. to obtain the desired grain structure and required physical properties therein necessary for steel strapping, air cooling the moving strips to a temperature slightly above 180° F. by passing them through the cooling tower in proximity to unheated portions of the strips, passing the moving strips at about 180° F. through a paint bath, further cooling the moving painted strips to dry the paint thereon, removing the coil set from the moving painted strips, waxing the moving painted strips, and coiling the painted, waxed strips in coils of about 100 pounds.

References Cited in the file of this patent

UNITED STATES PATENTS

| 337,690 | Logan | Mar. 9, 1886 |
| 2,327,256 | Fowle et al. | Aug. 17, 1943 |
| 2,588,439 | Ward | Mar. 11, 1952 |

OTHER REFERENCES

Shannon: Sheet Steel and Tin Plate, chapter 13, pp. 177–187, 1930.

Sauver: Metallography and Heat Treatment of Iron and Steel, p. 59, 1938.

Woldman: Materials Engineering to Metal Products, p. 148, 1949.

Making, Shaping, and Treating of Steel, pp. 734, 812, and 412–419, 7th ed., 1957.